US010142595B2

United States Patent
Tsuchiya et al.

(10) Patent No.: US 10,142,595 B2
(45) Date of Patent: Nov. 27, 2018

(54) DRIVING ASSISTANCE DEVICE AND METHOD OF DETECTING VEHICLE ADJACENT THERETO

(75) Inventors: Chikao Tsuchiya, Atsugi (JP); Yasuhisa Hayakawa, Atsugi (JP); Shinya Tanaka, Atsugi (JP); Osamu Fukata, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 640 days.

(21) Appl. No.: 13/823,414

(22) PCT Filed: Apr. 11, 2012

(86) PCT No.: PCT/JP2012/059914
§ 371 (c)(1),
(2), (4) Date: Mar. 14, 2013

(87) PCT Pub. No.: WO2012/141219
PCT Pub. Date: Oct. 18, 2012

(65) Prior Publication Data
US 2013/0242102 A1    Sep. 19, 2013

(30) Foreign Application Priority Data
Apr. 13, 2011 (JP) .................................. 2011-088726

(51) Int. Cl.
*H04N 7/18* (2006.01)
*G08G 1/16* (2006.01)
*G06K 9/00* (2006.01)

(52) U.S. Cl.
CPC ........... *H04N 7/18* (2013.01); *G06K 9/00805* (2013.01); *G08G 1/166* (2013.01); *G08G 1/167* (2013.01)

(58) Field of Classification Search
CPC ....... H04N 7/18; G06K 9/00805; G08G 1/166
(Continued)

(56) References Cited

U.S. PATENT DOCUMENTS 4,158,841 A * 6/1979 Wuchner ............... G01S 7/4026
342/109
6,130,506 A * 10/2000 Lopez .................. B60Q 1/0023
307/10.8
(Continued)

FOREIGN PATENT DOCUMENTS

JP    2006-85285 A    3/2006
JP    2007-276733 A    10/2007
(Continued)

OTHER PUBLICATIONS

Supplementary European Search Report dated May 22, 2014, 5 pgs.

*Primary Examiner* — Jorge L Ortiz Criado
*Assistant Examiner* — Stefan Gadomski
(74) *Attorney, Agent, or Firm* — Foley & Lardner LLP

(57) ABSTRACT

A driving assistance device includes a camera, a moving object detector, a candidate reflection region detector, a predetermined position brightness detector and a cause determiner. The moving object detector and the candidate reflection region detector set a detection region for detecting, from image data captured by the camera, an existence of an adjacent vehicle in an adjacent lane. The predetermined position brightness detector detects a candidate light projecting object which projects light with brightness equal to or higher than a predetermined threshold value. The cause determiner determines whether or not there exists a candidate light projecting object which indicates the existence of the adjacent vehicle in the detection region.

7 Claims, 8 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2004/0016870 A1* | 1/2004 | Pawlicki et al. ............ 250/208.1 | |
| 2005/0265579 A1* | 12/2005 | Nishida .............. G06K 9/00798 | |
| | | | 382/103 |
| 2006/0077070 A1* | 4/2006 | Huang ................. B62D 15/029 | |
| | | | 340/907 |
| 2006/0184297 A1 | 8/2006 | Higgins-Luthman | |
| 2006/0287828 A1* | 12/2006 | Lehner ................... G08G 1/166 | |
| | | | 701/301 |
| 2007/0126565 A1* | 6/2007 | Hahn .................... B60W 50/14 | |
| | | | 340/435 |
| 2007/0150196 A1* | 6/2007 | Grimm ......................... 701/301 | |
| 2007/0268159 A1* | 11/2007 | Futamura ..................... 340/933 | |
| 2008/0125972 A1* | 5/2008 | Neff .............................. 701/300 | |
| 2008/0205706 A1* | 8/2008 | Hongo ...................... B60R 1/00 | |
| | | | 382/104 |
| 2009/0102629 A1* | 4/2009 | Kaller et al. .................. 340/435 | |
| 2009/0184844 A1* | 7/2009 | Faber ............................ 340/937 | |
| 2010/0002078 A1* | 1/2010 | Ito .............................. B60R 1/00 | |
| | | | 348/135 |
| 2010/0061594 A1* | 3/2010 | Heinrich et al. .............. 382/103 | |
| 2010/0220190 A1* | 9/2010 | Hiroshi ..................... B60R 1/00 | |
| | | | 348/148 |
| 2011/0216194 A1* | 9/2011 | Kosaki .................... H04N 7/18 | |
| | | | 348/148 |
| 2012/0154591 A1* | 6/2012 | Baur et al. .................... 348/148 | |
| 2012/0221207 A1 | 8/2012 | Nakamura | |

FOREIGN PATENT DOCUMENTS

| | | |
|---|---|---|
| JP | 2008-219063 A | 9/2008 |
| JP | 2009-211309 A | 9/2009 |
| JP | 2010-205087 A | 9/2010 |
| WO | WO 2011/037109 A1 | 3/2011 |

\* cited by examiner

DRIVING ASSISTANCE DEVICE AND METHOD OF DETECTING VEHICLE ADJACENT THERETO

TECHNICAL FIELD

The present invention relates to a driving assistance device and a method of detecting a vehicle adjacent thereto.

BACKGROUND ART

Patent Literature 1 has proposed a driving assistance device which detects a pedestrian by extracting a pair of object regions aligned in a horizontal direction as a left region and a right region in a manner corresponding to the feet of the pedestrian, and by detecting a change in brightness in the regions.

CITATION LIST

Patent Literature

Patent Literature 1: Japanese Patent Application Laid-Open Publication No. 2010-205087

SUMMARY OF INVENTION

Technical Problem

However, the driving assistance device disclosed in Patent Literature 1 cannot determine whether an object is located in an adjacent lane or in a next adjacent lane which is adjacent to the adjacent lane, by detecting a change in brightness when the detected object is shining. Therefore, detection accuracy of an adjacent vehicle (including a motorcycle or a bicycle) may decrease.

The present invention, which has been made to solve the conventional problems described above, is directed to providing a driving assistance device which can improve detection accuracy of an adjacent vehicle and a method of detecting a vehicle adjacent thereto.

Solution to Problem

In a driving assistance device according to an embodiment of the present invention, a road surface reflection region detector detects, from an image capturing region behind a side of an own vehicle in which images are captured by an image capturing unit, a high-brightness region in which brightness is equal to or higher than a predetermined threshold value. In addition, a predetermined position brightness detector detects brightness at a position separated from the own vehicle by a predetermined distance. The position separated from the own vehicle by a predetermined distance is located in a straight-line direction linking a position of the above-mentioned high-brightness region and the image capturing unit, in a state of viewing the vehicle from above. Furthermore, a brightness difference detector calculates the difference between the brightness value of the high-brightness region and the brightness value at a position separated from the own vehicle by a predetermined distance, and an adjacent vehicle detector detects an adjacent vehicle from the brightness difference.

Advantageous Effects of Invention

According to the present invention, a road surface reflecting the light of another vehicle in an adjacent lane or the light of another vehicle in a next adjacent lane is supposed to be detected by detecting, from the image capturing region, a high-brightness region in which brightness is equal to or higher than a predetermined threshold value. In addition, the brightness is detected at a position located in a straight-line direction linking a position of the high-brightness region and the image capturing unit and separated from the own vehicle by a predetermined distance. Accordingly, if the high-brightness region is the road surface reflecting the light of another vehicle, it becomes possible to detect the position of the light of another vehicle by detecting the position being separated by a predetermined distance and passing the reflecting road surface. Subsequently, the difference between the brightness value of the high-brightness region and the brightness value of the position separated by a predetermined distance is detected, and an adjacent vehicle in the image capturing region is detected, based on the detected difference of brightness values. Accordingly, if the high-brightness region is the road surface reflecting the light of another vehicle, the difference of brightness values becomes larger because there exists a further brighter portion due to existence of the light of another vehicle at the position separated by a predetermined distance, otherwise the difference of brightness values tends to decrease. Therefore, the position of the light of another vehicle can be determined from the difference of brightness values, which makes it possible to improve detection accuracy of an adjacent vehicle.

BRIEF DESCRIPTION OF DRAWINGS

FIG. 4 shows details of a predetermined position brightness detector shown in FIG. 3, wherein FIG. 4(a) shows an image captured by a camera and FIG. 4(b) shows a position and a brightness value of a pixel thereabove.

FIG. 7 shows details of a predetermined position brightness detector shown in FIG. 6, wherein FIG. 7(a) shows an image captured by a camera and FIG. 7(b) shows a position and a brightness value of a pixel thereabove.

DESCRIPTION OF EMBODIMENTS

First Embodiment

Figure 1:
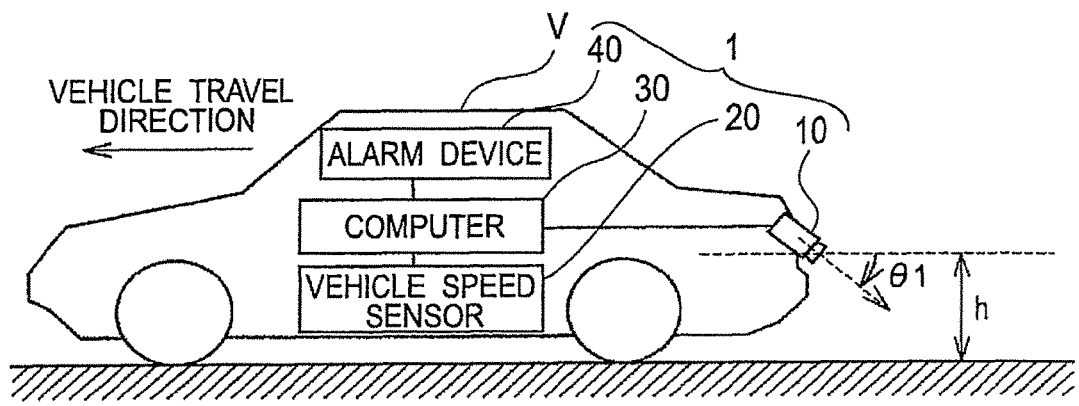
FIG. 1 is a schematic configuration diagram of a driving assistance device according to a first embodiment, showing an example where the driving assistance device is mounted on a vehicle.

A first embodiment of the present invention will be described first, referring to drawings. FIG. 1 is a schematic configuration diagram of a driving assistance device 1 according to the present embodiment, showing an example where the driving assistance device 1 is mounted on a vehicle V. The driving assistance device 1 shown in FIG. 1, which provides a driver of the own vehicle V with various information from a result of image capturing around the own vehicle V, includes a camera (image capturing unit/means) 10, a vehicle speed sensor 20, a computer 30, and an alarm device 40.

The camera 10 shown in FIG. 1 is attached to a position with a height h at the rear of the own vehicle V so that the optical axis is tilted downward from the horizontal line by an angle $\theta 1$. The camera 10 is configured to capture images of a detection region from this position. The vehicle speed sensor 20 detects the running speed of the own vehicle V, for which a sensor that detects the number of rotations of the wheels may be applied, for example. The computer 30 detects an adjacent vehicle (in the following, another vehicle is illustrated as an example of an adjacent vehicle) existing around the own vehicle V, based on the images captured by the camera 10. In addition, the computer 30 of the present embodiment is configured so as not to erroneously detect the position of another vehicle due to light such as light of another vehicle. The alarm device 40 warns the driver of the own vehicle V if an adjacent vehicle detected by the computer 30 may contact with the own vehicle V.

Figure 2:
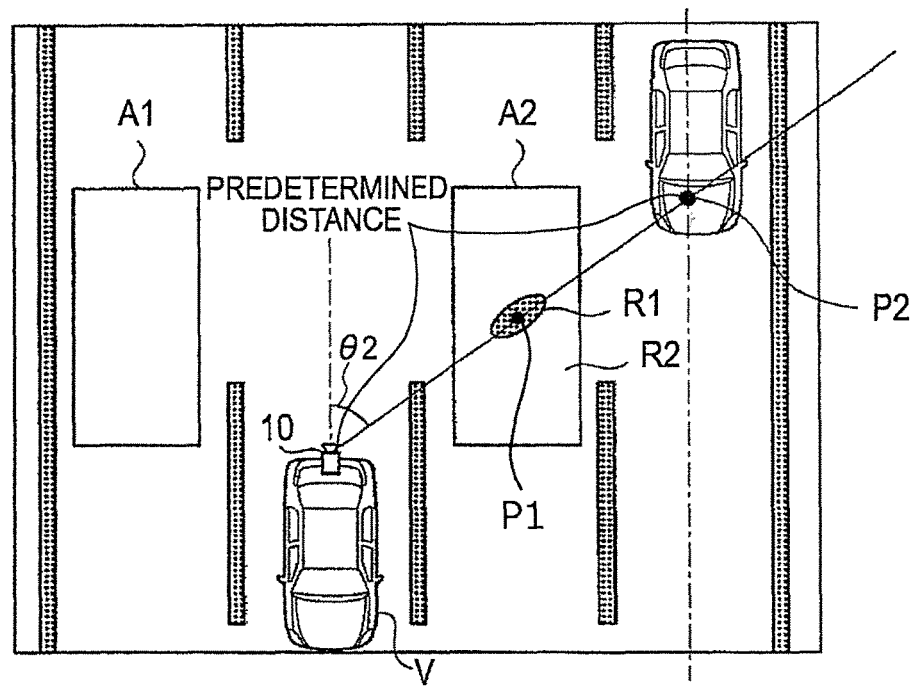
FIG. 2 is a top view showing a running state of the vehicle shown in FIG. 1.

FIG. 2 is a top view showing a running state of the vehicle shown in FIG. 1. As shown in FIG. 2, the camera 10 can capture images behind the side of the own vehicle V. In an adjacent lane, which is adjacent to the lane in which the own vehicle V is running, there are set detection regions A1 and A2 for detecting another vehicle. The computer 30 detects whether or not there exists another vehicle in the detection regions A1 and A2. Accordingly, the possibility of contact when the own vehicle V changes the lane can be determined.

Figure 3:
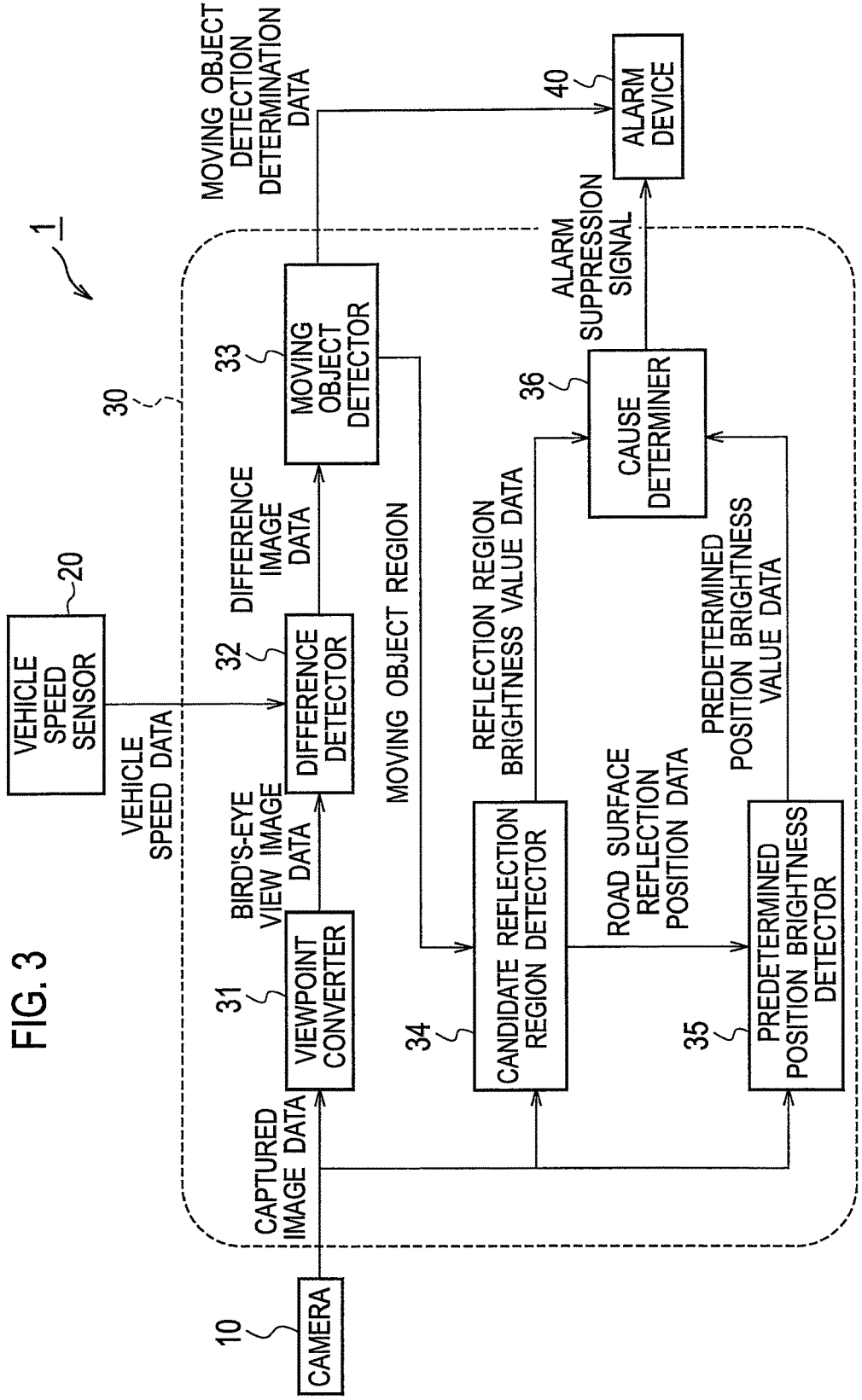
FIG. 3 is a block diagram showing details of a computer shown in FIG. 1.

FIG. 3 is a block diagram showing details of the computer 30 shown in FIG. 1. Note that, FIG. 3 also shows the camera 10, the vehicle speed sensor 20, and the alarm device 40 to clarify the relation of connection.

As shown in FIG. 3, the computer 30 includes a viewpoint converter 31, a difference detector 32, a moving object detector (moving object detecting means) 33, a candidate reflection region detector (candidate reflection region detecting means) 34, a predetermined position brightness detector (predetermined position brightness detecting means) 35, and a cause determiner 36. Note that, the moving object detector 33 and the candidate reflection region detector 34 constitute a detection region setter (detection region setting means) in the present embodiment. In addition, the predetermined position brightness detector 35 constitutes a candidate light projecting object detector (candidate light projecting object detecting means) in the present embodiment.

The viewpoint converter 31 inputs captured image data obtained from image-capturing by the camera 10, and converts the viewpoint of the captured and input image data into bird's-eye view image data in a state seen from a bird's eye. The state seen from a bird's eye refers for example to a state seen from the viewpoint of a virtual camera looking vertically downward from the sky. The viewpoint conversion is performed in a manner described in Japanese Patent Application Laid-Open Publication No. 2008-219063, for example, which is hereby incorporated by reference for its teachings related to performance of viewpoint conversion.

The difference detector 32 sequentially inputs the bird's-eye view image data obtained from viewpoint conversion by the viewpoint converter 31, and aligns the bird's-eye view image data of different input time points, based on the running speed of the own vehicle V obtained from the vehicle speed sensor 20. In addition, the difference detector 32, after having aligned the bird's-eye view image data of different time points, detects the difference between common parts thereof to generate difference image data.

The moving object detector 33 detects, from the difference image data generated by the difference detector 32, a difference value at positions corresponding to the detection regions A1 and A2, and divides each of the detection regions A1 and A2 into a moving object region R1 and a road surface region R2 by threshold value processing. Here, if the moving object region R1 is detected, another vehicle may exist in the region, and the moving object detector 33 transmits the effect to the alarm device 40 as moving object detection determination data.

Here, the moving object region R1 is also detected when light of another vehicle is reflected by the road surface. In other words, as shown in FIG. 2, there is a case where another vehicle exists in a next adjacent lane which is adjacent to the adjacent lane, the light of the other vehicle is reflected by the road surface of the adjacent lane, and the reflected light is detected as the moving object region R1. In such a case, issuing an alarm by the alarm device 40 results in presenting erroneous information to the driver of the own vehicle V. Therefore, the present embodiment is configured to prevent such a situation by the following configuration.

The candidate reflection region detector 34 detects, within an image capturing region whose images are captured by the camera 10, a high-brightness region in which brightness is equal to or higher than a predetermined threshold value. Specifically, the candidate reflection region detector 34 detects the high-brightness region in which brightness is equal to or higher than a predetermined threshold value, only in the moving object region R1 detected by the moving object detector 33.

When detecting the high-brightness region, the candidate reflection region detector 34 first sets a predetermined threshold value. The predetermined threshold value is determined based on an angle $\theta 2$ between the optical axis of the camera 10 and the straight line linking the region to be detected (i.e., the moving object region R1) and the camera 10, in a state of viewing the own vehicle V from above, and is adjusted to be higher for a smaller value of the angle $\theta 2$. Generally, the light of another vehicle is projected forward. Therefore, the smaller the angle $\theta 2$, the larger amount of light from another vehicle will be captured by the camera 10. Therefore, the smaller the angle $\theta 2$, the higher the predetermined threshold value is adjusted.

Upon setting a predetermined threshold value, the candidate reflection region detector 34 sets the moving object region R1 as the candidate reflection region R1, provided that the brightness value of the moving object region R1 is equal to or higher than the predetermined threshold value. Note that, the range of setting and the rate of change of the threshold value are experimentally set, with the setting here being only exemplary, and thus setting of the threshold value is not limited to that described above.

Additionally, in practice, the candidate reflection region R1 may include noise, which can be eliminated by applying an opening process to a binary image expressing the candidate reflection region R1, for example.

Upon setting the candidate reflection region R1 as described above, the candidate reflection region detector 34 determines a representative point P1 and a representative brightness value P of the candidate reflection region R1. In this occasion, the candidate reflection region detector 34 sets the representative point P1 as the centroid position of the candidate reflection region R1 and sets the representative brightness value P as the brightness value of the centroid position. Note that, the representative point P1 and the representative brightness value P are not limited to those described above, and the representative point P1 may be a point closer to the own vehicle in the candidate reflection region R1, for example, and the representative brightness value P may be a statistical value such as the average brightness value or the 90 percentile value of the candidate reflection region R1.

The predetermined position brightness detector 35 specifies a region having a brightness value equal to or higher than a predetermined value and a number of pixels equal to or larger than a predetermined number as a candidate light projecting region (a region where a next adjacent vehicle is regarded as a candidate light projecting object) from a region of the next adjacent lane within a certain range of direction angles around a straight-line direction linking the position of the candidate reflection region R1 and the camera 10, in a state of viewing the own vehicle V from above. Here, although the predetermined number of pixels is assumed to be equal to or larger than three in the original captured image, this is not limiting and a value equal to or larger than three may be set. Accordingly, light projection from a light source such as a streetlight which is not a vehicle can be first eliminated from the candidate light projecting region. Subsequently, brightness values are scanned and detected upward in the real space from the representative position in the candidate light projecting region in order to determine whether or not the candidate light projecting object is the next adjacent vehicle.

Specifically, the predetermined position brightness detector 35 detects a position P2 which is an intersection point between a straight-line direction linking the position of the candidate reflection region R1 and the camera 10 and a substantial centerline of the next adjacent lane, in a state of viewing the own vehicle V from above. Subsequently, the predetermined position brightness detector 35 scans and detects brightness values upward in the real space from the position P2.

Note that, the reason for defining the position P2 as the intersection point with the substantial centerline of the next adjacent lane is because influence of halation causes the highly bright portion to appear larger than its actual size, and thus headlight of another vehicle in a next adjacent lane can be captured even if the vehicle shifts transversely to some extent, with the substantial centerline of the next adjacent lane taken as a reference.

Figure 4:
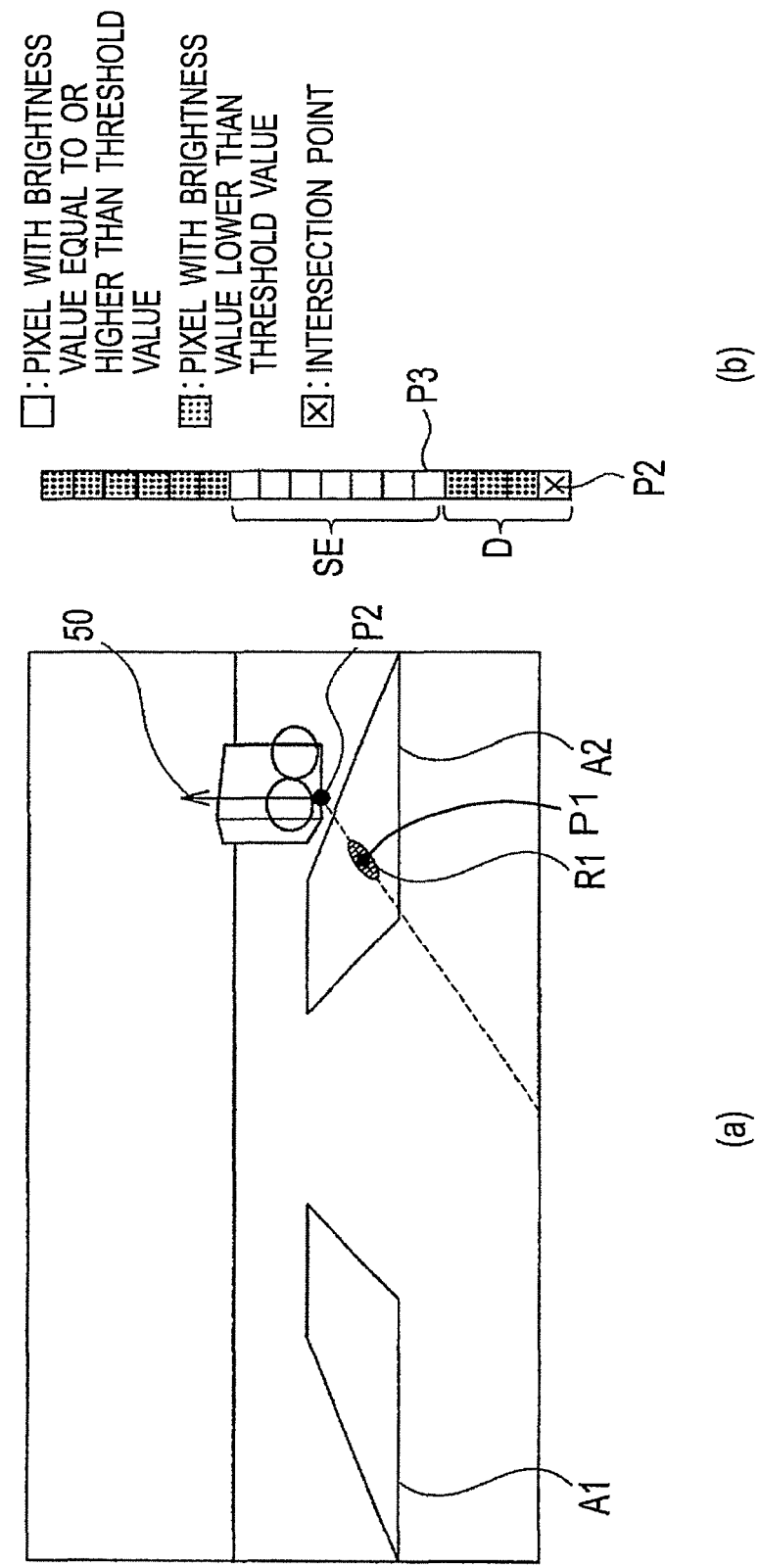

FIG. 4 shows details of the predetermined position brightness detector 35 shown in FIG. 3, wherein FIG. 4(a) shows an image captured by the camera 10 and FIG. 4(b) shows the position P2 and a brightness value of a pixel thereabove.

As shown in FIG. 4, upon detecting the position P2, the predetermined position brightness detector 35 scans and detects brightness values upward from the position P2. In other words, brightness values are obtained along a line indicated by a reference numeral "50" of FIG. 4(a).

Furthermore, the predetermined position brightness detector 35 then detects a section having successive brightness values equal to or higher than a predetermined value. As shown in FIG. 4(b), the fourth to the tenth pixels above the position P2 form a section SE having successive brightness values equal to or higher than a predetermined value.

Subsequently, the cause determiner 36 obtains a representative brightness value Q of the section SE. The representative brightness value Q may be the brightness value of the centroid (center) or may be a statistical value, as with the representative brightness value P. Then, the cause determiner 36 then calculates the difference of brightness values between the representative brightness values P and Q. Furthermore, if the difference of brightness values is larger than a threshold value TH, the cause determiner 36 determines that the candidate reflection region R1 is reflection of the light of another vehicle by the road surface in a next adjacent lane. Otherwise, the cause determiner 36 determines that the candidate reflection region R1 is the light from another vehicle in an adjacent lane, and regards that there exists an adjacent vehicle.

Note that, the cause determiner 36 also performs the following process in order to detect another vehicle in an adjacent lane with a higher accuracy. The cause determiner 36 first determines whether or not the number of pixels in the section SE is equal to or smaller than a defined value. Here, the case that the number of pixels in the extracted section SE having successive brightness values is equal to or smaller than the defined value suggests the case where the highly bright portion is small and less than the size of the light of another vehicle in a next adjacent lane. In this case, the cause determiner 36 determines that the section SE is not the light of another vehicle in the next adjacent lane but is the light of an adjacent vehicle, and detects the adjacent vehicle. If, on the other hand, the number of pixels in the section SE is not equal to or smaller than the defined value, the cause determiner 36 determines that the section SE is the light of another vehicle in a next adjacent lane. In other words, it is determined that the candidate reflection region R1 is reflection of the light of another vehicle by the road surface in a next adjacent lane.

In addition, the cause determiner 36 obtains a distance D between the lowest point P3 of the section SE and the position P2 detected by the predetermined position brightness detector 35. The cause determiner 36 then determines whether or not the distance D is equal to or smaller than a predetermined distance. If the distance is equal to or smaller than the predetermined distance, the position is too low for the light of another vehicle in the next adjacent lane, and thus it can be determined that it is not the light of another vehicle in a next adjacent lane. Accordingly, the cause determiner 36 determines that the section SE is the light of an adjacent vehicle and detects the adjacent vehicle. If, on the other hand, the distance D is not equal to or smaller than the predetermined distance, the cause determiner 36 determines that the section SE is the light of another vehicle in a next adjacent lane. In other words, it is determined that the candidate reflection region R1 is reflection of the light of another vehicle by the road surface in a next adjacent lane.

In summary of the above, the driving assistance device according to the present embodiment provides a driver with various pieces of information from a result of capturing images around an own vehicle, and includes: an image capturing unit (camera 10) mounted on the own vehicle to capture images behind a side of the own vehicle; a detection region setter (moving object detector 33 and candidate reflection region detector 34) that sets a detection region for detecting, from image data captured by the image capturing unit, existence of an adjacent vehicle in an adjacent lane; a candidate light projecting object detector (predetermined position brightness detector 35) that detects a candidate light projecting object which projects light with brightness equal to or higher than a predetermined threshold value; a cause determiner (cause determiner 36) that determines whether or not there exists a candidate light projecting object which indicates existence of the adjacent vehicle in the detection region set by the detection region setter; and an information provider (alarm device 40) that provides the driver with information of existence of the adjacent vehicle, if it is determined by the cause determiner that light is projected from the adjacent vehicle, wherein it may be said that the cause determiner determines whether or not the light is projected from the adjacent vehicle by detecting an image capturing position (corresponding to distance D) of the candidate light projecting object detected by the candidate light projecting object detector.

Figure 5:
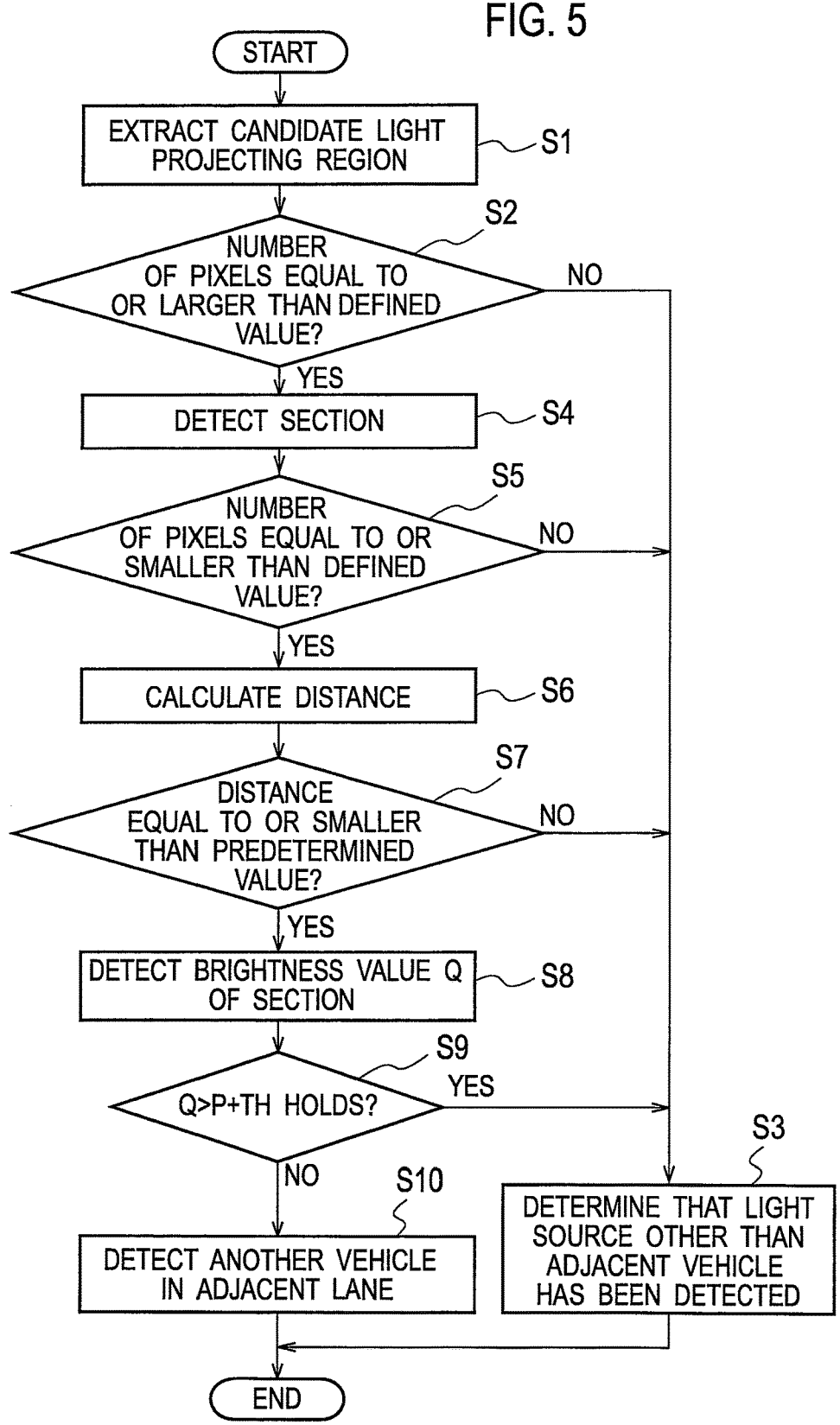
FIG. 5 is a flow chart showing a method of detecting an adjacent vehicle for the driving assistance device according to the present embodiment, and describes details of the processing of the predetermined position brightness detector and a cause determiner shown in FIG. 3.

Next, a method of detecting an adjacent vehicle for the driving assistance device 1 according to the present embodiment will be described. FIG. 5 is a flow chart showing the method of detecting an adjacent vehicle for the driving assistance device 1 according to the present embodiment, and describes details of the processing of the predetermined position brightness detector 35 and the cause determiner 36 shown in FIG. 3.

First, as shown in FIG. 5, the predetermined position brightness detector 35 specifies a region having a brightness value equal to or higher than a predetermined value as a candidate light projecting region RS from a region of the next adjacent lane within a certain range of direction angles around a straight-line direction linking the position of the candidate reflection region R1 and the camera 10, in a state of viewing the own vehicle V from above (S1).

Subsequently, the predetermined position brightness detector 35 determines whether or not the number of pixels in the candidate light projecting region RS is equal to or larger than a predetermined number (defined value of pixels) (S2). Then, if it is determined that the number of pixels in the candidate light projecting region RS is not equal to or larger than the defined value (NO in S2), it is very likely that the candidate light projecting region RS is light projected from a light source such as a streetlight which is not a vehicle, and thus the cause determiner 36 determines the candidate light projecting region RS as a region in which a light source other than an adjacent vehicle has been detected (S3). If, on the other hand, it is determined that the number of pixels in the candidate light projecting region RS is equal to or larger than the defined value (YES in S2), it is very likely that the candidate light projecting region RS is light projected from an adjacent vehicle or a next adjacent vehicle, and thus the predetermined position brightness detector 35 scans and detects brightness values upward in the real space from the representative position in the candidate light projecting region RS in order to determine which one the vehicle is.

If, on the other hand, it is determined that the number of pixels in the candidate light projecting region RS is equal to or larger than the defined value (YES in S2), it is very likely that the candidate light projecting region RS is light projected from an adjacent vehicle or a next adjacent vehicle, and thus the predetermined position brightness detector 35 scans and detects brightness values upward in the real space from the representative position in the candidate light projecting region RS in order to determine which one the vehicle is (S4). In other words, the predetermined position brightness detector 35 scans and detects brightness values upward in the real space from the position P2 specified as a representative position in the candidate light projecting region RS, and detects the section SE having brightness values equal to or higher than a predetermined value (S4). Subsequently, the cause determiner 36 determines whether or not the number of pixels in the section SE is equal to or smaller than the defined value (S5).

If it is determined that the number of pixels in the section SE is not equal to or smaller than the defined value (NO in S5), it is very likely that the section SE is the light of another vehicle in a next adjacent lane since the number of pixels is larger than the defined value, and thus the cause determiner 36 determines that the candidate reflection region R1 is reflection of the light of another vehicle in a next adjacent lane (S3). Subsequently, the process shown in FIG. 5 is completed.

If, on the other hand, it is determined that the number of pixels in the section SE is equal to or smaller than the defined value (YES in S5), the cause determiner 36 calculates the distance D between the lowest point P3 of the section SE and the specified position P2 (S6). Subsequently, the cause determiner 36 determines whether or not the distance D is equal to or smaller than a predetermined distance (S7). The distance D may be set, without being limited to the section SE, as the distance from the camera to the light source of the next adjacent vehicle in the vehicle width direction. In addition, a combination of the above may be set. For example, if the height direction distance (section SE) is fixed to 70 cm, the vehicle width direction distance may be set in the range of 1 m to 4.5 m, for example, or if the vehicle width direction distance is fixed to 6.5 m, the height direction distance may be set in the range of 60 to 90 cm. However, these values are only exemplary and not limited thereto. The light source of the next adjacent vehicle is supposed to be determined by going through this step.

If it is determined that the distance D is not equal to or smaller than the predetermined distance (NO in S7), it is very likely that the section SE is the light of another vehicle in a next adjacent lane since the distance D is at least as high as the light of another vehicle, and thus the cause determiner 36 determines that the candidate reflection region R1 is reflection of the light of another vehicle in a next adjacent lane (S3). Subsequently, the process shown in FIG. 5 is completed.

If, on the other hand, it is determined that the distance D is equal to or smaller than the predetermined distance (YES in S7), the cause determiner 36 detects the representative brightness value Q of the section SE (S8). Subsequently, the cause determiner 36 determines whether or not the equation "representative brightness value Q">"representative brightness value P"+"threshold value TH" holds (S9).

If it is determined that the equation "representative brightness value Q">"representative brightness value P"+"threshold value TH" holds (YES in S9), the difference of brightness values between both brightness values P and Q is larger than the threshold value TH, and thus the cause determiner 36 determines that the candidate reflection region R1 is reflection of light of another vehicle in a next adjacent lane (S3). Subsequently, the process shown in FIG. 5 is completed.

If, on the other hand, it is determined that the equation "representative brightness value Q">"representative brightness value P"+"threshold value TH" does not hold (NO in S9), the difference of brightness values between both brightness values P and Q is smaller than the threshold value TH, and thus the cause determiner 36 determines that the candidate reflection region R1 results from the light of another vehicle in an adjacent lane, and determines that there exists another vehicle in the adjacent lane (S10). Subsequently, the process shown in FIG. 5 is completed. Note that, the threshold value TH herein is set to a brightness level in the range of 5 to 10, for example.

Note that, if it is determined in the process of step S3 that the candidate reflection region R1 is reflection of light of another vehicle in the next adjacent lane, the cause determiner 36 outputs an alarm suppression signal, as shown in FIG. 3. Accordingly, a situation can be prevented in which an alarm is issued when there is no possibility of contact with another vehicle even if the own vehicle V changes the lane and thus no alarm is needed.

If, on the other hand, it is determined in the process of step S10 that there exists another vehicle in an adjacent lane, the cause determiner 36 does not output an alarm suppression signal, and the alarm device 40 is supposed to notify the driver of the existence of an adjacent vehicle via a buzzer or a lamp.

In summary of the above, the driving assistance method according to the present embodiment provides a driver with various pieces of information from a result of capturing images around an own vehicle by an image capturing unit (camera 10), and includes: an image capturing step of capturing images behind a side of the own vehicle by the image capturing unit mounted on the own vehicle; a detection region setting step of setting a detection region for detecting, from image data captured in the image capturing step, existence of an adjacent vehicle in an adjacent lane; a candidate light projecting object detecting step of detecting a candidate light projecting object which projects light with brightness equal to or higher than a predetermined threshold value; a cause determination step of determining whether or not there exists a candidate light projecting object which indicates existence of the adjacent vehicle in the detection region set in the detection region setting step; and an information providing step of providing the driver with information of existence of the adjacent vehicle, if it is determined in the cause determining step that light is projected from the adjacent vehicle, wherein it may be said that the cause determining step determines whether or not the light is projected from the adjacent vehicle by detecting an image capturing position (corresponding to distance D) of the candidate light projecting object detected in the candidate light projecting object step.

As thus described, the driving assistance device 1 and the adjacent vehicle detecting method according to the present embodiment can detect the road surface reflecting the light of another vehicle in an adjacent lane or the light of another vehicle in a next adjacent lane by detecting, from the image capturing region, the candidate reflection region R1 having a brightness equal to or higher than a predetermined threshold value. In addition, the brightness value of a position located in a straight-line direction linking the position of the candidate reflection region R1 and the camera 10 and separated from the own vehicle V by a predetermined distance is detected. Accordingly, if the candidate reflection region R1 is the road surface reflecting the light of another vehicle, it becomes possible to detect the position of the light of another vehicle by detecting the position being separated by a predetermined distance and passing the reflecting road surface. Subsequently, the difference between the brightness value P of the candidate reflection region R1 and the brightness value Q of the position separated by a predetermined distance is detected, and an adjacent vehicle in the image capturing region is detected, based on the detected difference of brightness values. Accordingly, if the candidate reflection region R1 is the road surface reflecting the light of another vehicle, the difference of brightness values becomes larger because there exists a further brighter portion due to existence of the light of another vehicle at the position separated by a predetermined distance, otherwise the difference of brightness values tends to decrease. Therefore, the position of the light of another vehicle can be determined from the difference of brightness values, which makes it possible to improve detection accuracy of an adjacent vehicle.

In addition, the predetermined threshold value is adjusted to be higher as an angle θ2 between the optical axis of the camera 10 and the straight line linking the region to be detected (i.e., the moving object region R1) and the camera 10 becomes smaller. Here, since the light of another vehicle is projected forward, the amount of light input to the camera 10 from a position closer to the optical axis of the camera 10 tends to be larger. Therefore, an appropriate threshold value can be set by adjusting a predetermined threshold value to be higher for a smaller value of the angle θ2.

In addition, a region where an adjacent vehicle can exist (i.e., the moving object region R1) is detected from the captured region, and the candidate reflection region R1 having a brightness equal to or higher than a predetermined threshold value is detected within a range limited to the detected region. Therefore, the amount of processing can be reduced without having to perform the above-mentioned process on unnecessary regions.

In addition, the position P2 in the next adjacent lane is specified, and brightness values are scanned and detected upward in the real space from the specified position P2. Therefore, the position of the light of another vehicle in a next adjacent lane can be captured with a much higher accuracy.

In addition, brightness values are scanned and detected upward in the real space from the specified position P2 to extract a section SE having successive brightness values equal to or higher than a predetermined value, and it is determined that an adjacent vehicle has been detected if the number of pixels in the extracted section SE having successive brightness values is equal to or smaller than a defined value. Therefore, if the number of pixels in the extracted section SE having successive brightness values is small and less than the size of the light, no erroneous determination is made that the section SE is reflection of the light of another vehicle in a next adjacent lane, which makes it possible to improve detection accuracy.

In addition, if the distance between the lowest point P3 of the extracted section SE having successive brightness values and the specified position P2 is equal to or smaller than a predetermined distance, it is determined that an adjacent vehicle has been detected. Therefore, if the lowest point P3 of the extracted section SE having successive brightness values is not at least as high as the light position of another vehicle and the distance from the specified position P2 is close, no erroneous determination is made that the section SE is reflection of the light of another vehicle in a next adjacent lane, which makes it possible to improve detection accuracy.

Second Embodiment

Next, a second embodiment of the present invention will be described. A driving assistance device 2 and an adjacent vehicle detecting method thereof according to the second embodiment are similar to those of the first embodiment, except that a part of the configuration and processes are different. In the following, difference from the first embodiment will be described.

Figure 6:
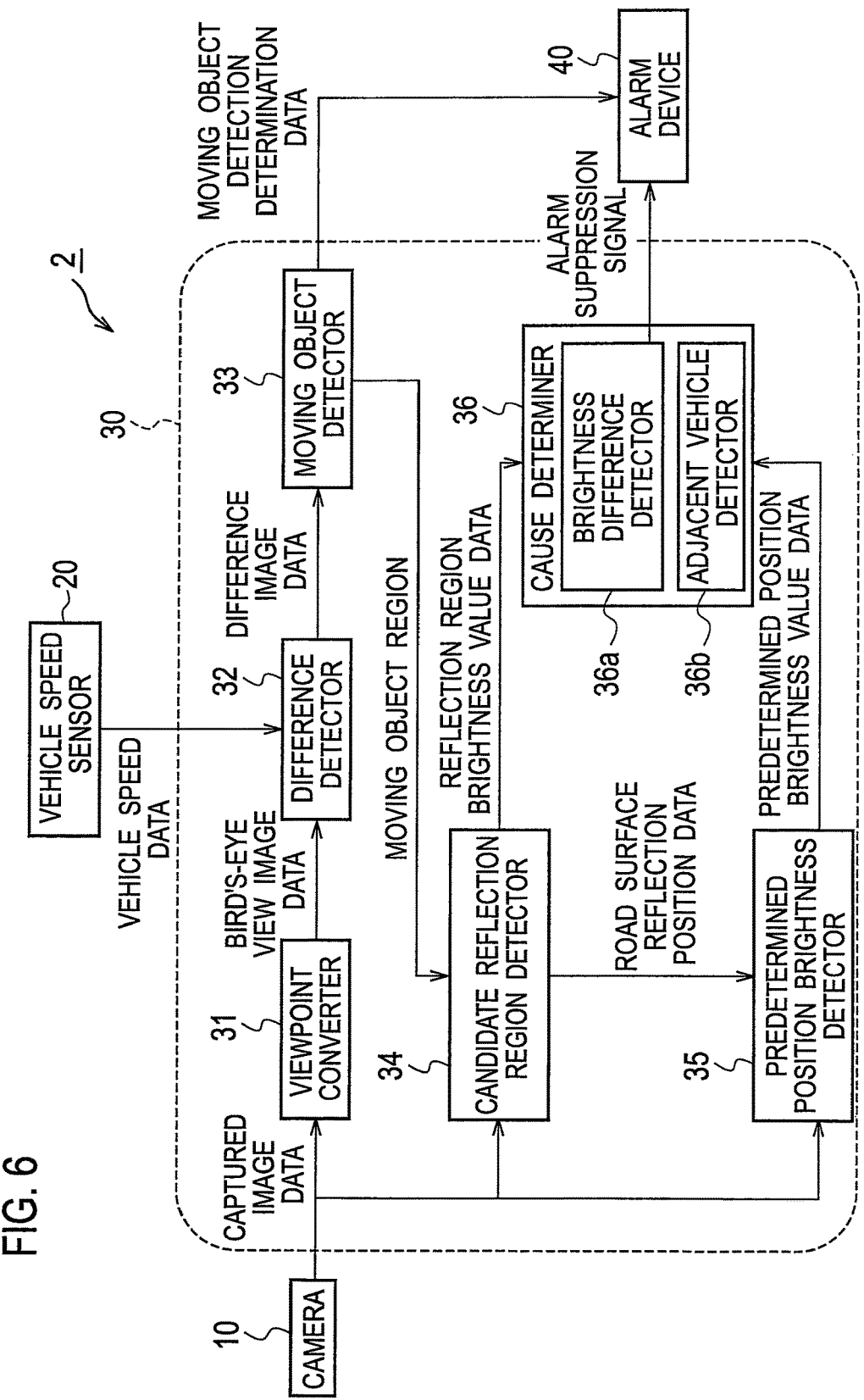
FIG. 6 is a block diagram showing details of a computer of a driving assistance device according to a second embodiment.

FIG. 6 is a block diagram showing details of the computer 30 of the driving assistance device 2 according to the second embodiment. Note that, FIG. 6 also shows the camera 10 and the alarm device 40 to clarify the relation of connection.

As shown in FIG. 6, in the computer 30 of the second embodiment, the cause determiner 36 has brightness difference detector (brightness difference detecting means) 36a and an adjacent vehicle detector (adjacent vehicle detecting means) 36b. Note that, the moving object detector 33 and the candidate reflection region detector 34 constitute the detection region setter (detection region setting means) of the present embodiment. In addition, the predetermined position brightness detector 35 constitutes the candidate light projecting object detector (candidate light projecting object detecting means) of the present embodiment.

Figure 7:
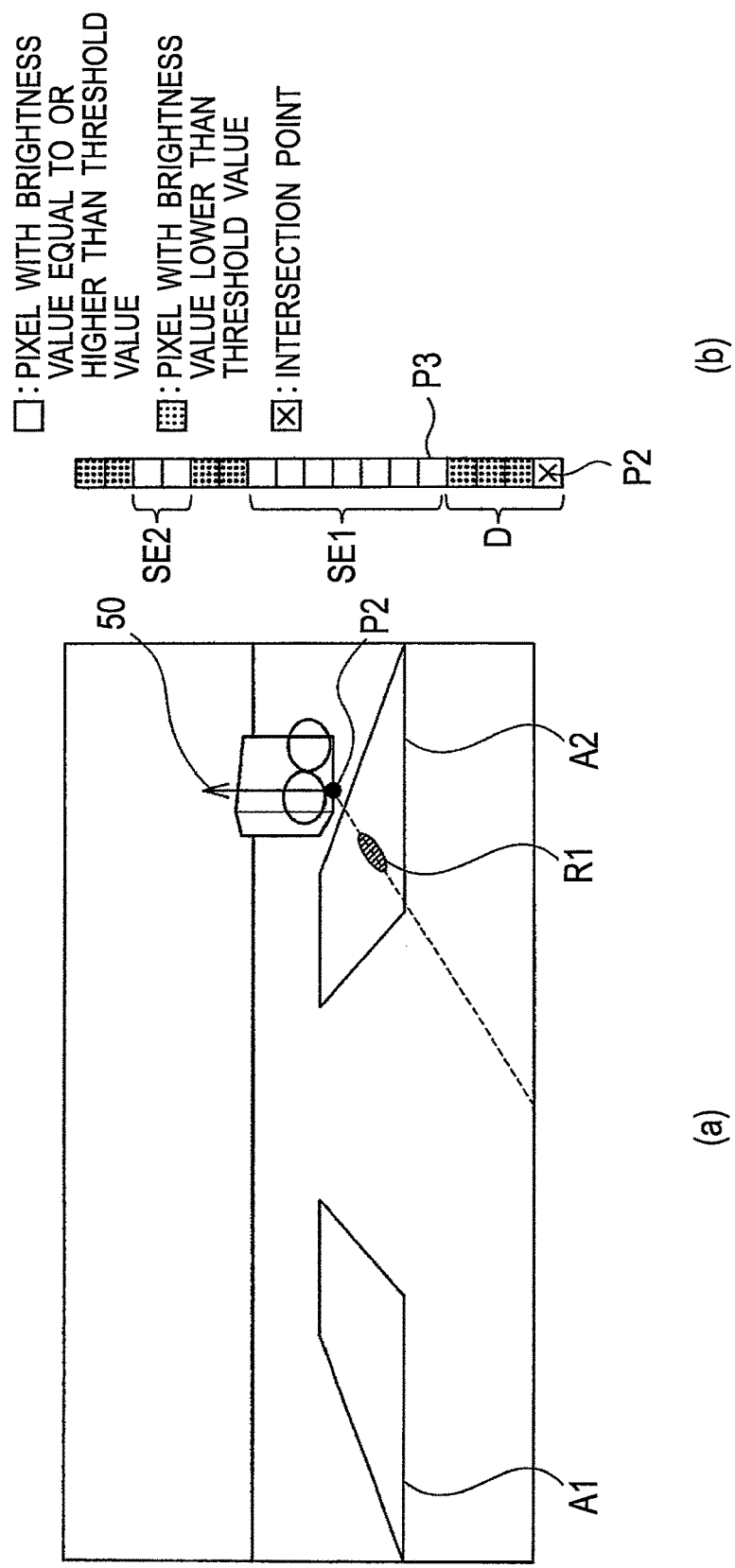

FIG. 7 shows details of a predetermined position brightness detector 35 according to the present embodiment shown in FIG. 6, wherein FIG. 7(a) shows an image captured by the camera 10 and FIG. 7(b) shows the brightness value of a pixel thereabove.

As shown in FIG. 7, upon detecting the position P2, the predetermined position brightness detector 35 scans and detects brightness values upward from the position P2. In other words, brightness values are obtained along a line indicated by a reference numeral "50" of FIG. 7(a).

Moreover, the predetermined position brightness detector 35 then detects a section having successive brightness values equal to or higher than a predetermined value. As shown in FIG. 7(b), the fourth to the tenth pixels above the position P2 form a section SE1 having successive brightness values equal to or higher than a predetermined value. Similarly, the thirteenth and fourteenth pixels above the position P2 form a section SE2 having successive brightness values equal to or higher than a predetermined value.

As described above, upon detecting the sections SE1 and SE2 having successive brightness values equal to or higher than a predetermined value by the predetermined position brightness detector 35, the adjacent vehicle detector 36b selects, from the sections SE1 and SE2 described above, the section SE1 having the maximum number of successive brightness values.

Subsequently, the brightness difference detector 36a obtains the representative brightness value Q of the section SE1. The representative brightness value Q may be the brightness value of the centroid (center) or may be a statistical value, as with the representative brightness value P. Then, the brightness difference detector 36a calculates the difference of brightness values between the representative brightness values P and Q. If the difference of brightness values is larger than a threshold value TH, the adjacent vehicle detector 36b determines that the candidate reflection region R1 is reflection of the light of another vehicle by the road surface in a next adjacent lane. On the other hand, otherwise, the adjacent vehicle detector 36b determines that the candidate reflection region R1 is the light from another vehicle in an adjacent lane, and regards that there exists the adjacent vehicle.

Note that, the adjacent vehicle detector 36b also performs the following process in order to detect another vehicle in an adjacent lane with a higher accuracy. The adjacent vehicle detector 36b first determines whether or not the number of pixels in the section SE1 is equal to or smaller than a defined value. Here, the case that the number of pixels in the extracted section SE1 having successive brightness values is equal to or smaller than the defined value suggests the case where the highly bright portion is small and less than the size of the light of another vehicle in a next adjacent lane. In this case, the adjacent vehicle detector 36b determines that the section SE1 is not the light of another vehicle in a next adjacent lane but is the light of an adjacent vehicle, and detects the adjacent vehicle. If, on the other hand, the number of pixels in the section SE1 is equal to or smaller than the defined value, the adjacent vehicle detector 36b determines that the section SE1 is the light of another vehicle in a next adjacent lane. In other words, it is determined that the candidate reflection region R1 is reflection of the light of another vehicle by the road surface in a next adjacent lane.

In addition, the adjacent vehicle detector 36b obtains the distance D between the lowest point P3 of the section SE1 detected by the predetermined position brightness detector 35 and the position P2. The adjacent vehicle detector 36b then determines whether or not the distance D is equal to or smaller than a predetermined distance. If the distance is equal to or smaller than the predetermined distance, the position is too low for the light of another vehicle in the next adjacent lane, and thus it can be determined that there it is not the light of another vehicle in the next adjacent lane. Accordingly, the adjacent vehicle detector 36b determines that the section SE1 is the light of an adjacent vehicle and detects the adjacent vehicle. If, on the other hand, the distance D is not equal to or smaller than the predetermined distance, the adjacent vehicle detector 36b determines that the section SE1 is the light of another vehicle in a next adjacent lane. In other words, it is determined that the candidate reflection region R1 is reflection of the light of another vehicle by the road surface in the next adjacent lane.

The driving assistance device according to the second embodiment provides, as with the first embodiment, a driver with various pieces of information from a result of capturing images around an own vehicle, and includes: an image capturing unit (camera 10) mounted on the own vehicle to capture images behind a side of the own vehicle; a detection region setter (moving object detector 33 and candidate reflection region detector 34) that sets a detection region for detecting, from image data captured by the image capturing unit, existence of an adjacent vehicle in an adjacent lane; a candidate light projecting object detector (predetermined position brightness detector 35) that detects a candidate light projecting object which projects light with brightness equal to or higher than a predetermined threshold value; a cause determiner (cause determiner 36) that determines whether or not there exists a candidate light projecting object which indicates existence of the adjacent vehicle in the detection region set by the detection region setter; and an information provider (alarm device 40) that provides the driver with information of existence of the adjacent vehicle, if it is determined by the cause determiner that light is projected from the adjacent vehicle, wherein it may be said that the cause determiner determines whether or not the light is projected from the adjacent vehicle by detecting an image capturing position (corresponding to distance D) of the candidate light projecting object detected by the candidate light projecting object detector.

Figure 8:
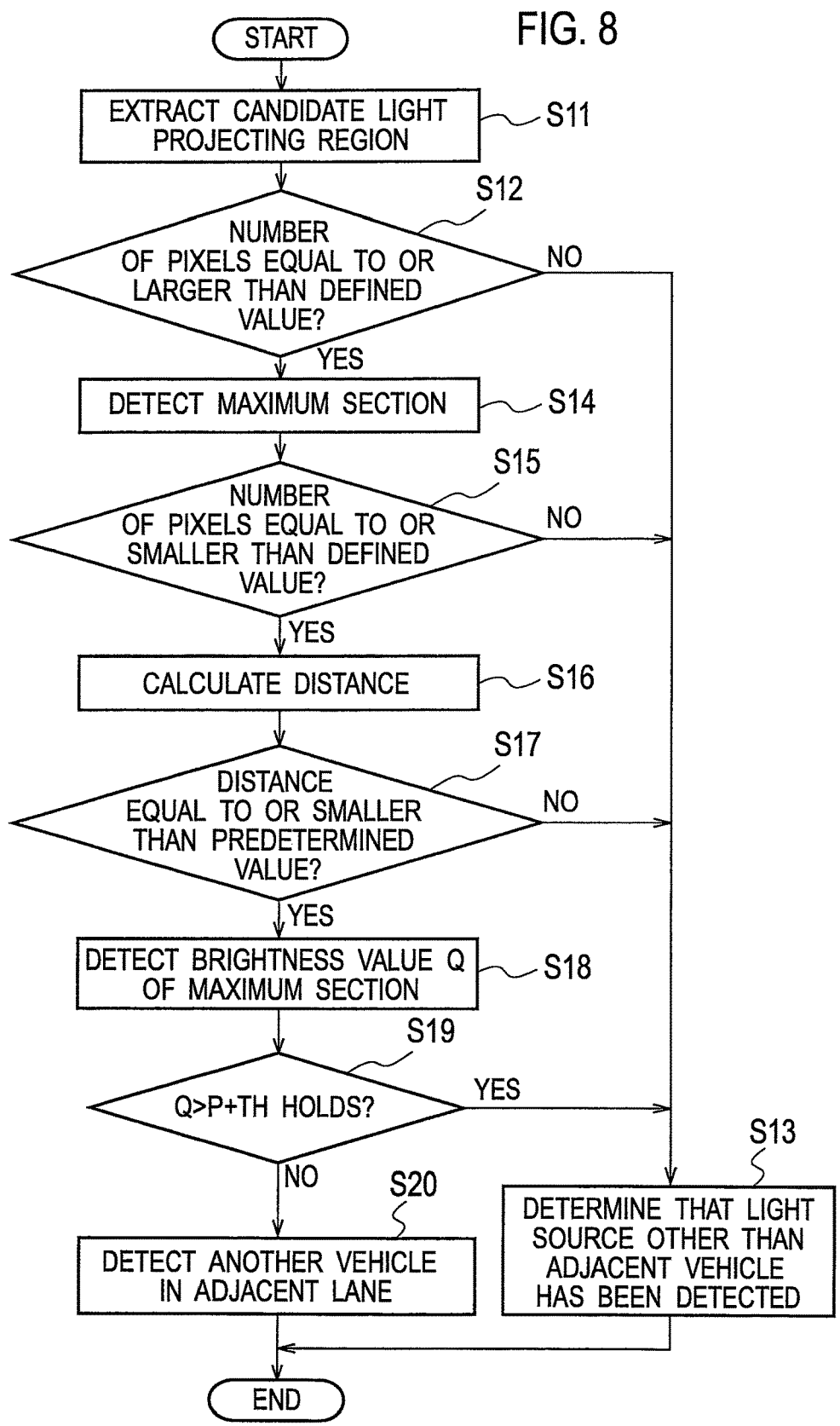
FIG. 8 is a flow chart showing a method of detecting an adjacent vehicle for the driving assistance device according to the present embodiment, and describes details of the processing of the predetermined position brightness detector and a cause determiner shown in FIG. 6.

Next, an adjacent vehicle detecting method of the driving assistance device 2 according to the present embodiment will be described. FIG. 8 is a flow chart showing the method of detecting an adjacent vehicle for the driving assistance device 2 according to the present embodiment, and describes details of the processing of the predetermined position brightness detector 35 and the cause determiner 36 shown in FIG. 6.

First, as shown in FIG. 8, the predetermined position brightness detector 35 specifies a region having a brightness value equal to or higher than a predetermined value as the candidate light projecting region RS from a region of the next adjacent lane within a certain range of direction angles around a straight-line direction linking the position of the candidate reflection region R1 and the camera 10, in a state of viewing the own vehicle V from above (S11).

Subsequently, the predetermined position brightness detector 35 determines whether or not the number of pixels in the candidate light projecting region RS is equal to or larger than a predetermined value (defined value of the number of pixels) (S12). Then, if it is determined that the number of pixels in the candidate light projecting region RS is not equal to or larger than the defined value (NO in S12), it is very likely that the candidate light projecting region RS is light projection from a light source such as a streetlight which is not a vehicle, and thus the cause determiner 36 determines that the candidate light projecting region RS has been detected as a light source other than an adjacent vehicle (S13). If, on the other hand, it is determined that the number of pixels in the candidate light projecting region RS is equal to or larger than the defined value (YES in S12), it is very likely that the candidate light projecting region RS is light projected from an adjacent vehicle or a next adjacent vehicle, and thus the predetermined position brightness detector 35 scans and detects brightness values upward in the real space from the representative position in the candidate light projecting region RS in order to determine which one the vehicle is. Here, the defined value of number of pixels is equal to or larger than three in the original captured image. However, this is not limiting and a value equal to or larger than three may be set.

If, on the other hand, it is determined that the number of pixels in the candidate light projecting region RS is equal to or larger than the defined value (YES in S12), it is very likely that the candidate light projecting region RS is light projected from an adjacent vehicle or a next adjacent vehicle, and thus the predetermined position brightness detector 35 scans and detects brightness values upward in the real space from the representative position in the candidate light projecting region RS in order to determine which one the vehicle is (S14). In other words, the predetermined position brightness detector 35 scans and detects brightness values upward in the real space from the position P2 specified as a representative position in the candidate light projecting region RS, and detects the largest one of the sections SE1 and SE2 having a brightness value equal to or higher than a predetermined value (S14). Subsequently, the adjacent vehicle detector 36b determines whether or not the number of pixels in the largest section SE1 is equal to or smaller than the defined value (S15).

If it is determined that the number of pixels in the largest section SE1 is not equal to or smaller than the defined value (NO in S15), it is very likely that the section SE1 is the light of another vehicle in a next adjacent lane since the number of pixels is larger than the defined value, and thus the adjacent vehicle detector 36b determines that the candidate reflection region R1 is reflection of the light of another vehicle in a next adjacent lane (S13). Subsequently, the process shown in FIG. 8 is completed.

If, on the other hand, it is determined that the number of pixels in the largest section SE1 is equal to or smaller than the defined value (YES in S15), the adjacent vehicle detector 36b calculates the distance D between the lowest point P3 of the section SE1 and the specified position P2 (S16). Subsequently, the adjacent vehicle detector 36b determines whether or not the distance D is equal to or smaller than a predetermined distance (S17). The distance D may be set, without being limited to the section SE1, as the distance from the camera to the light source of the next adjacent vehicle in the vehicle width direction. In addition, a combination of the above may be set. For example, if the height direction distance (section SE1) is fixed to 70 cm, the vehicle width direction distance may be set in the range of 1 m to 4.5 m, for example, or if the vehicle width direction distance is fixed to 6.5 m, the height direction distance may be set in the range of 60 to 90 cm. However, these values are only exemplary and not limited thereto. The light source of the next adjacent vehicle is supposed to be determined by going through this step.

If it is determined that the distance D is not equal to or smaller than the predetermined distance (NO in S17), it is very likely that the section SE1 is the light of another vehicle in a next adjacent lane since the distance D is at least as high as the light of another vehicle, and thus the adjacent vehicle detector 36b determines that the candidate reflection region R1 is reflection of the light of another vehicle in a next adjacent lane (S13). Subsequently, the process shown in FIG. 8 is completed.

If, on the other hand, it is determined that the distance D is equal to or smaller than the predetermined distance (YES in S17), the brightness difference detector 36a detects the representative brightness value Q of the largest section SE1 (S18). Subsequently, the brightness difference detector 36a determines whether or not the equation "representative brightness value Q">"brightness value P"+"threshold value TH" holds (S19).

If it is determined that the equation "representative brightness value Q">"representative brightness value P"+"threshold value TH" holds (YES in S19), the difference of brightness values between both brightness values P and Q is larger than the threshold value TH, and thus the adjacent vehicle detector 36b determines that the candidate reflection region R1 is reflection of light of another vehicle in a next adjacent lane (S13). Subsequently, the process shown in FIG. 8 is completed.

If, on the other hand, it is determined that the equation "representative brightness value Q">"representative brightness value P"+"threshold value TH" does not hold (NO in S19), the difference of brightness values between both brightness values P and Q is smaller than the threshold value TH, and thus the adjacent vehicle detector 36b determines that the candidate reflection region R1 results from the light of another vehicle in an adjacent lane, and determines that there exists another vehicle in the adjacent lane (S20). Subsequently, the process shown in FIG. 8 is completed. Note that, the threshold value TH herein is set to a brightness level in the range of 5 to 10, for example.

Note that, if it is determined in the process of step S13 that the candidate reflection region R1 is reflection of light of another vehicle in a next adjacent lane, the cause determiner 36 outputs an alarm suppression signal, as shown in FIG. 6. Accordingly, a situation can be prevented in which an alarm is issued when there is no possibility of contact with another vehicle even if the own vehicle V changes the lane and thus no alarm is needed.

If, on the other hand, it is determined in the process of step S20 that there exists another vehicle in an adjacent lane, the cause determiner 36 does not output an alarm suppression signal, and the alarm device 40 is supposed to notify the driver of the existence of an adjacent vehicle via a buzzer or a lamp.

The driving assistance method according to the second embodiment also provides, as with the first embodiment, a driver with various pieces of information from a result of capturing images around an own vehicle by an image capturing unit (camera 10), and includes: an image capturing step of capturing images behind a side of the own vehicle by an image capturing unit mounted on the own vehicle; a detection region setting step of setting a detection region for detecting, from image data captured in the image capturing step, existence of an adjacent vehicle in an adjacent lane; a candidate light projecting object detecting step of detecting a candidate light projecting object which projects light with brightness equal to or higher than a predetermined threshold value; a cause determination step of determining whether or not there exists a candidate light projecting object which indicates existence of the adjacent vehicle in the detection region set in the detection region setting step; and an information providing step of providing the driver with information of existence of the adjacent vehicle, if it is determined in the cause determining step that light is projected from the adjacent vehicle, wherein it may be said that the cause determining step determines whether or not the light is projected from the adjacent vehicle by detecting an image capturing position (corresponding to distance D) of the candidate light projecting object detected in the candidate light projecting object step.

As thus described, the driving assistance device 2 and the adjacent vehicle detecting method according to the present embodiment can detect the road surface reflecting the light of another vehicle in an adjacent lane or the light of another vehicle in a next adjacent lane by detecting, from the image capturing region, the candidate reflection region R1 having a brightness equal to or higher than a predetermined threshold value. In addition, the brightness value of a position located in a straight-line direction linking a position of the candidate reflection region R1 and the camera 10 and separated from the own vehicle V by a predetermined distance is detected. Accordingly, if the candidate reflection region R1 is the road surface reflecting the light of another vehicle, it becomes possible to detect a position of the light of another vehicle by detecting the position being separated by a predetermined distance and passing the reflecting road surface. Subsequently, the difference between the brightness value P of the candidate reflection region R1 and the brightness value Q of the position separated by a predetermined distance is detected, and an adjacent vehicle in the image capturing region is detected, based on the detected difference of brightness values. Accordingly, if the candidate reflection region R1 is the road surface reflecting the light of another vehicle, the difference of brightness values becomes larger because there exists a further brighter portion due to existence of the light of another vehicle at the position separated by a predetermined distance, otherwise the difference of brightness values tends to decrease. Therefore, the position of the light of another vehicle can be determined from the difference of brightness values, which makes it possible to improve detection accuracy of an adjacent vehicle.

In addition, the predetermined threshold value is adjusted to be higher as the angle θ2 between the optical axis of the camera 10 and the straight line linking the region to be detected (i.e., the moving object region R1) and the camera 10 becomes smaller. Here, since the light of another vehicle is projected forward, the amount of light input to the camera 10 from a position closer to the optical axis of the camera 10 tends to be larger. Therefore, an appropriate threshold value can be set by adjusting a predetermined threshold value to be higher for a smaller value of the above-mentioned angle θ2.

Moreover, a region where an adjacent vehicle can exist (i.e., the moving object region R1) is detected from the captured region, and the candidate reflection region R1 having a brightness equal to or higher than a predetermined threshold value is detected, within a range limited to the detected region. Therefore, the amount of processing can be reduced without having to perform the above-mentioned process on unnecessary regions.

In addition, the position P2 in the next adjacent lane is specified, and brightness values are scanned and detected upward in the real space from the specified position P2. Therefore, the position of the light of another vehicle in the next adjacent lane can be captured with a much higher accuracy.

Furthermore, brightness values are scanned and detected upward in the real space from the specified position P2 to extract sections SE1 and SE2 having successive brightness values equal to or higher than a predetermined value, and it is determined that an adjacent vehicle has been detected if the number of pixels in the extracted section SE1 having successive brightness values is equal to or smaller than a defined value. Therefore, if the number of pixels in the extracted section SE1 having successive brightness values is small and less than the size of the light, no erroneous determination is made that the section SE1 is reflection of the light of another vehicle in a next adjacent lane, which makes it possible to improve detection accuracy.

In addition, if the distance between the lowest point P3 of the extracted section SE1 having successive brightness values and the specified position P2 is equal to or smaller than a predetermined distance, it is determined that an adjacent vehicle has been detected. Therefore, if the lowest point P3 of the extracted section SE1 having successive brightness values is not at least as high as the light position of another vehicle and the distance from the specified position P2 is close, no erroneous determination is made that the section SE1 is reflection of the light of another vehicle in a next adjacent lane, which makes it possible to improve detection accuracy.

Third Embodiment

Next, a third embodiment of the present invention will be described. A driving assistance device 3 and an adjacent vehicle detecting method thereof according to the third embodiment are similar to those of the second embodiment, except that a part of the configuration and processes are different. In the following, difference from the second embodiment will be described.

Figure 9:
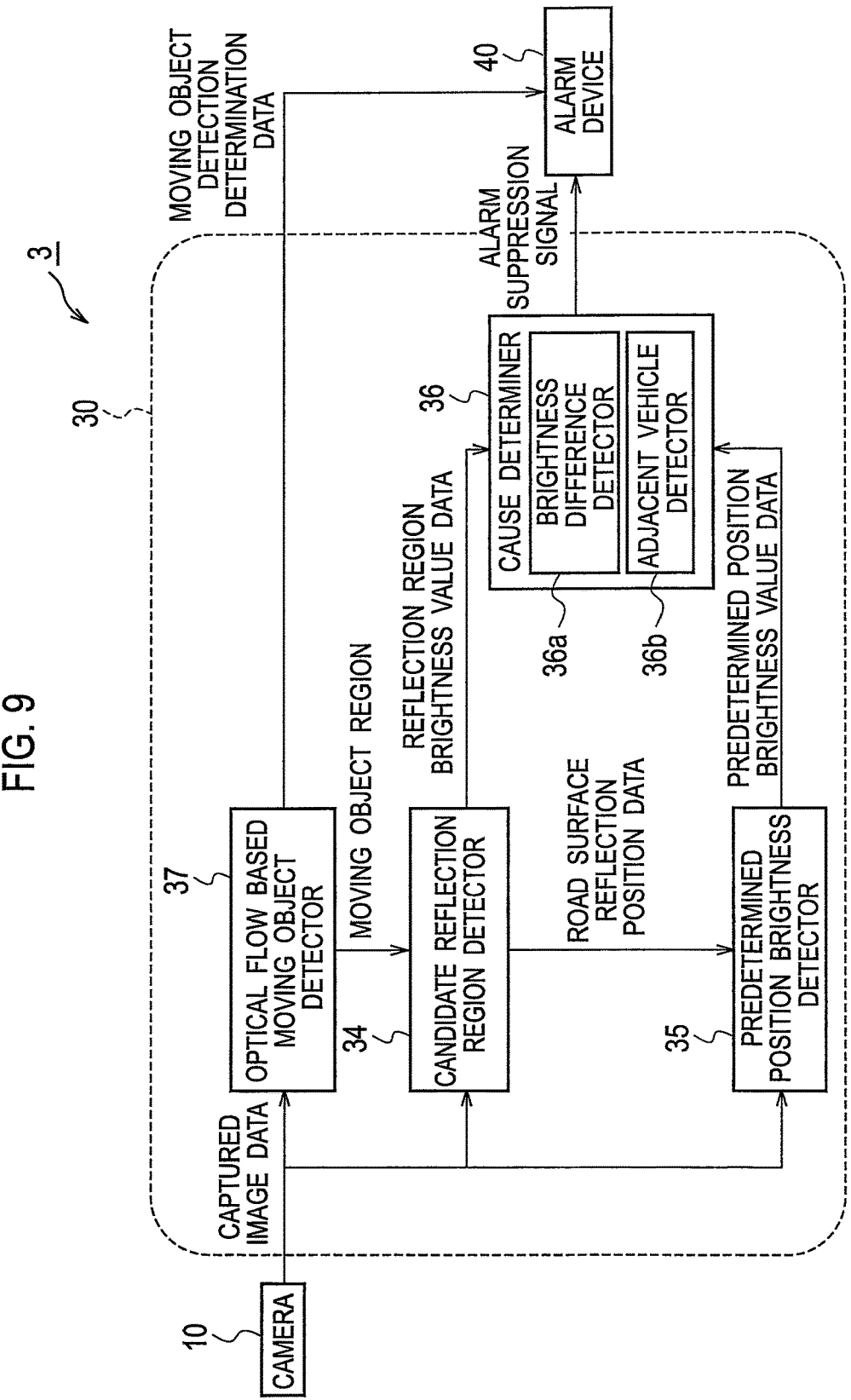
FIG. 9 is a block diagram showing details of a computer of a driving assistance device according to a third embodiment.

FIG. 9 is a block diagram showing details of the computer 30 of the driving assistance device 3 according to the third embodiment. FIG. 9 also shows the camera 10 and the alarm device 40 to clarify the relation of connection.

As shown in FIG. 9, the computer 30 of the third embodiment includes an optical flow based moving object detector (region detecting means) 37, in place of the viewpoint converter 31, the difference detector 32, and the moving object detector 33.

The optical flow based moving object detector 37 detects another vehicle from a motion vector of an object in an image, in a manner specifically described in Japanese Patent No. 4367475. In this occasion, the optical flow based moving object detector 37 detects the moving object region R1 and transmits it to the candidate reflection region detector 34, as with the moving object detector 33 described in the second embodiment.

Note that, the processes performed by the candidate reflection region detector 34, the predetermined position brightness detector 35, and the cause determiner 36 are similar to those of the second embodiment. The moving object detector 33 and the candidate reflection region detector 34 constitute the detection region setter (detection region setting means) of the present embodiment. The predetermined position brightness detector 35 constitutes the candidate light projecting object detector (candidate light projecting object detecting means) of the present embodiment.

As thus described, the driving assistance device 3 and the adjacent vehicle detecting method according to the third embodiment can improve detection accuracy of an adjacent vehicle, as with the second embodiment. Moreover, an appropriate threshold value can be set, and whereby the amount of processing can be reduced. In addition, the position of the light of another vehicle in a next adjacent lane can be captured with a much higher accuracy, which makes it possible to improve detection accuracy.

Furthermore, since the third embodiment includes the optical flow based moving object detector 37, the moving object region R1 can be detected even if there is no signal from the vehicle speed sensor 20.

As above, although the present invention has been described based on embodiments, the present invention is not limited to the embodiments described above and changes may be made, or embodiments may be combined within a range which does not deviate from the scope of the present invention.

For example, although the driving assistance devices 1 and 2 are mounted on the vehicle V in the embodiments described above, they may be mounted on a motor cycle or an automatic navigation robot, without being limited thereto. In addition, the adjacent vehicle may be a motor cycle or a bicycle.

In addition, although the above-mentioned embodiment has not particularly referred to the weather when the own vehicle V is running, road surface reflection (specular reflection) of the light of another vehicle becomes larger when it is raining. Therefore, when it is raining, a threshold value THR which is smaller than the threshold value TH used when it is not raining may be used as the threshold value in step S7 of FIG. 5 and step S17 of FIG. 8 (steps of determining whether the candidate reflection region R1 is reflection of the light of another vehicle by the road surface in an adjacent lane or the light of another vehicle in a next adjacent lane). In this occasion, it is determined that the candidate reflection region R1 is the light of another vehicle in an adjacent lane (S8, S18), only when the difference between the representative brightness value P of the candidate reflection region R1 and the brightness value Q of the position separated by a predetermined distance is smaller than the threshold value THR. Therefore, it becomes possible to detect an adjacent vehicle according to the weather when the own vehicle V is running.

If, on the other hand, in the above-mentioned steps, if it has been determined that the difference between the representative brightness value P of the candidate reflection region R1 and the brightness value Q of the position separated by a predetermined distance is higher than the threshold value THR, it is determined that the candidate reflection region R1 is specular reflection by the light of another vehicle in a next adjacent line. In this case, a masking process with regard to the specular reflection in the reflection region candidate R1 is performed for a predetermined period. In this occasion, the period is set longer if the candidate reflection region R1 is located further behind the own vehicle V (i.e., the angle θ2 in FIG. 2 is smaller), or longer if the candidate reflection region R1 exists in the passing lane relative to the own vehicle V than if otherwise.

INDUSTRIAL APPLICABILITY

As is apparent from the above description, the present invention can provide a driving assistance device and a driving assistance method which can detect an adjacent vehicle with a high accuracy.

REFERENCE SIGNS LIST 1 driving assistance device
10 camera (image capturing unit/means)
20 vehicle speed sensor
30 computer
31 viewpoint converter
32 difference detector
33 moving object detector (region detecting means)
34 candidate reflection region detector (road surface reflection region detecting means)
35 predetermined position brightness detector (predetermined position brightness detecting means)
36 cause determiner
36a brightness difference detector (brightness difference detecting means)
36b adjacent vehicle detector (adjacent vehicle detecting means)
37 optical flow based moving object detector (region detecting unit/means)
40 alarm device
V own vehicle

The invention claimed is:

1. A driving assistance device that provides a driver with various pieces of information from a result of capturing images around a first vehicle in a first traffic lane, comprising:
an image capturing unit mounted on the first vehicle to capture images behind a side of the vehicle;
a computer that implements:
a viewpoint converter,
a moving object detector,
a candidate reflection region detector,
a predetermined position brightness detector,
a cause determiner, and
an information provider;
wherein the viewpoint converter converts image data captured by the image capturing unit into bird's eye view image data;
wherein the moving object detector and the candidate reflection region detector constitute a detection region setter that:
sets a first detection region for detecting, from image data captured by the image capturing unit, an existence of a second vehicle in a second traffic lane that is directly next to the first traffic lane; and
detects, as a first detection region, a high-brightness region in which brightness is equal to or higher than a first predetermined threshold value, within an image capturing region of the images captured by the image capturing unit, and detects brightness of the high-brightness region;
wherein the predetermined position brightness detector detects
a first candidate light projecting region which projects light, in the first detection region, with brightness equal to or higher than the first predetermined threshold value; and
a second candidate light projecting region which projects light, from a third traffic lane that is adjacent to the second traffic lane, with brightness equal to or higher than a second predetermined threshold value different from the first predetermined threshold value in a second region of the third traffic lane; and detects, as the second candidate light projecting region, a position located in a straight line direction linking a position of the high-brightness region detected by the candidate reflection region detector and the image capturing unit and separated from the first vehicle by a predetermined distance, and detects brightness of the position;

wherein the cause determiner constitutes a brightness difference detector and a second vehicle detector that:

detects a brightness difference between the brightness of the high-brightness region detected by the candidate reflection region detector and the brightness of the position detected by the predetermined position brightness detector; and detects the second vehicle in the first detection region, based on the brightness difference detected by the brightness difference detector; and determines that the light projected from the first candidate light projecting region is light projected from the second vehicle in the second traffic lane; and makes the determination by calculating the position of the second candidate light projecting region is separated from the first vehicle by the predetermined distance, and in a direction from the first vehicle to the first candidate light projecting region;

wherein the information provider provides the driver with information of the existence of the second vehicle as signaled by the cause determiner that light is projected from the second vehicle in the second traffic lane, and wherein the predetermined position brightness detector specifies a position located in the straight line direction linking the position of the high-brightness region detected by the candidate reflection region detector and the image capturing unit, and located in the third traffic lane which is adjacent to the second traffic lane which is adjacent to the first traffic lane of the first vehicle, and scans and detects brightness values upward in a real space from the specified position.

2. The driving assistance device according to claim 1, wherein the candidate reflection region detector adjusts the first predetermined threshold value to be higher as an angle between an optical axis of the image capturing unit and a straight line linking the region to be detected and the image capturing unit becomes smaller.

3. The driving assistance device according to claim 1, wherein the candidate reflection region detector detects, as the first detection region, the high-brightness region in which brightness is equal to or higher than the first predetermined threshold value, within a range limited to a region detected by the detection region setter.

4. The driving assistance device according to claim 1, wherein the predetermined position brightness detector scans and detects the brightness values upward in the real space from the specified position, and extracts a section having successive brightness values equal to or higher than the second predetermined threshold value as the second candidate light projecting region, and the second vehicle detector determines that a second vehicle has been detected, if a number of pixels in the section having successive brightness values extracted by the predetermined position brightness detector is equal to or smaller than a defined value.

5. The driving assistance device according to claim 4, wherein the second vehicle detector determines that a second vehicle has been detected, if a distance between a lowest point of the section having successive brightness values extracted by the predetermined position brightness detector and the specified position is equal to or smaller than a predetermined distance.

6. A driving assistance method that provides a driver with various pieces of information from a result of capturing images around a first vehicle in a first traffic lane by an image capturing unit, the method comprising:

an image capturing step of capturing images behind a side of the first vehicle by the image capturing unit mounted on the first vehicle;

a viewpoint converting step of converting image data captured in the image capturing step into bird's-eye view image data;

a detection region setting step of setting a first detection region for detecting, from image data captured in the image capturing step, an existence of a second vehicle in a second traffic lane that is directly next to the first traffic lane; and detecting, as the first detection region, a high-brightness region in which brightness is equal to or higher than a first predetermined threshold value, within an image capturing region of the images captured by the image capturing unit, and detecting brightness of the high-brightness region;

a candidate light projecting object detecting step of detecting a first candidate light projecting region which projects light, in the first detection region, with brightness equal to or higher than the first predetermined threshold value in the first detection region, and a second candidate light projecting region which projects light, from a third traffic lane that is adjacent to the second traffic lane, with brightness equal to or higher than a second predetermined threshold value in a second region of the third traffic lane; and detecting, as the second candidate light projecting region, a position located in a straight-line direction linking a position of the high-brightness region and the image capturing unit and separated from the first vehicle by a predetermined distance, and detecting brightness of the position;

a cause determination step of detecting a brightness difference between the brightness of the high-brightness region detected in the detection region setting step and the brightness of the position; and detecting the second vehicle in the first detection region, based on the brightness difference; and determining that the light projected from the first candidate light projecting region is light projected from the second vehicle in the second traffic lane; and making the determination by calculating the position of the second candidate light projecting region is separated from the first vehicle by the predetermined distance, and in a direction from the first vehicle to the first candidate light projecting region; and an information providing step of providing the driver with information of the existence of the second vehicle as signaled in the cause determination step that light is projected from the second vehicle in the second traffic lane, wherein the candidate light projecting object detecting step comprises specifying a position located in the straight-line direction linking the position of the high-brightness region and the image capturing unit, and located in the third traffic lane which is adjacent to the second traffic lane which is adjacent to the first traffic lane of the first vehicle, and scanning and detecting brightness values upward in a real space from a specified position.

7. The driving assistance device according to claim 1, wherein the cause determiner outputs an alarm suppression signal to the information provider to signal that light is projected from the second vehicle in the third traffic lane such that the information provider does not provide the driver with information of the existence of the second vehicle.

* * * * *